E. F. NORTHRUP.
ELECTRICAL MEASURING INSTRUMENT.
APPLICATION FILED DEC. 7, 1908.

950,513.

Patented Mar. 1, 1910.

UNITED STATES PATENT OFFICE.

EDWIN F. NORTHRUP, OF PHILADELPHIA, PENNSYLVANIA, ASSIGNOR TO LEEDS AND NORTHRUP COMPANY, A CORPORATION OF PENNSYLVANIA.

ELECTRICAL MEASURING INSTRUMENT.

950,513.      Specification of Letters Patent.      Patented Mar. 1, 1910.

Application filed December 7, 1908. Serial No. 466,242.

*To all whom it may concern:*

Be it known that I, EDWIN F. NORTHRUP, a citizen of the United States, residing in the city of Philadelphia, county of Philadelphia, and State of Pennsylvania, have invented a certain new and useful Electrical Measuring Instrument, of which the following is a specification.

My invention relates to an electrical measuring instrument, preferably direct reading, involving the use of a differential galvanometer, as of the D'Arsonval, moving magnet, or other type, or involving the use of a differential telephone, for electrically measuring temperatures as, for example, in the case where a resistance is employed for temperature measurement, such resistance changing with temperature; or for making electrical measurements other than those relating to temperature.

In one of its forms my invention resides in a circuit or resistance balancing device, in which the coils of a differential galvanometer, differential telephone, or other differential device, are connected in different circuits or branches, and a slide wire or adjustable resistance constitutes balancing means, a direct reading scale, preferably uniform, being provided for reading directly in temperature units, or other units; and it is a further feature of my invention, in such arrangement, to provide a shunt for the slide wire or adjustable resistance so as to change the extent of the range of the instrument; and it is a further feature of my invention to provide in one of the circuits or branches a suitable resistance for shifting the scale range of the instrument, as will be hereinafter explained. And it is a further feature of my invention to employ for the slide wire or adjustable resistance a conductor whose resistance does not increase uniformly with its length, but is modified so as to increase non-uniformly and in a manner to correct for the variation from a straight line or linear function of any variation of resistance or other property of any element connected in one or more circuits or branches of the balancing arrangement, or in any associated circuit.

A further feature of my invention resides in the employment of only three thermometer leads, in the case of electrical temperature measurement, and so arranged and combined with other elements as to perfectly eliminate all error which in other arrangements is introduced when only three thermometer leads are used.

My invention resides in other features hereinafter pointed out and claimed, and is not restricted to the features hereinbefore mentioned, except in so far as such limitations are expressed in the claims.

For an illustration of one of the forms my invention may take, reference is to be had to the accompanying drawing, in which.

Figures 1, 2, 3, 4:
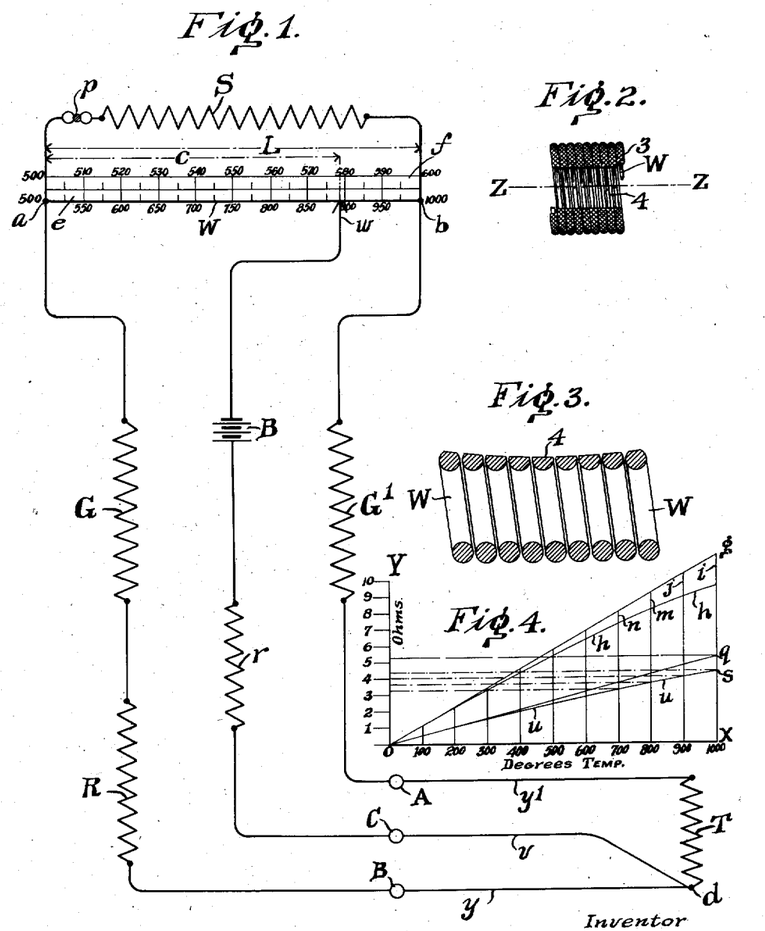
Figure 1 is a diagrammatic view of a circuit or resistance balancing device adapted for the electrical measurement of temperature in accordance with an illustrative of my invention.
Fig. 2 is a fragmentary view illustrating a form the slide wire or adjustable resistance may take.
Fig. 3 is a cross sectional view through a resistance of the type shown in Fig. 2, but on a line as Z—Z, Fig. 2, showing non-uniform or modified cross section for securing non-uniform or modified resistance.
Fig. 4 illustrates a graphic method of determining to what extent and in what manner to modify or vary the slide wire or adjustable resistance.

In Fig. 1, the circuit or resistance balancing arrangement comprises the slide wire or adjustable resistance conductor W extending between the points $a$ and $b$, and engaging with the conductor W is the movable or sliding contact $w$. The portions of the resistance conductor W to the right and left of the sliding contact $w$ constitute variable resistances in different circuits or branches; one of these branches extends through G' and T to the point $d$, one terminal of the resistance T which may be an unknown resistance to be measured, or any other resistance, and in electric thermometry is the bulb or thermometer resistance. Another branch of the resistance balancing device extends through G and R to the point $d$. And between the point $d$ and the sliding contact $w$ are connected the source of energy B and a resistance $r$. And in shunt to the slide wire or adjustable resistance W may be connected a shunt resistance S by the closure of a switch, as by the insertion of a plug $p$. It is to be understood, however, that the shunt S may be either present or absent, according to circumstances hereinafter described, and when present may be permanently connected in shunt to W without the intervention of a plug or switch.

The sliding contact $w$ is adapted to carry a pointer which coöperates with or moves over the two uniformly graduated scales $e$ and $f$.

G and G′ are the coils or windings of a differential galvanometer, such as a D'Arsonval galvanometer, or a galvanometer of the moving magnet type, or any other suitable type. Or where the source B furnishes alternating or pulsating current G and G′ may be the coils of a differential telephone, a balance being determined by complete silence in the telephone.

When a differential galvanometer is used, it may take, among numerous forms, the form shown in Letters Patent of the United States No. 800,873, heretofore granted to me. However, the coils G and G′ in this case are bifilarly wound, and the two windings so connected in circuit that the torque, due to the coil G′ exactly nullifies or balances the torque due to the coil G′ when the same amount of current is flowing through each. And, in such case, the coils G and G′ being bifilarly wound, the two coil conductors may be wound into a coil side by side as if a single conductor, so as to insure that the winding G shall be subjected to exactly the same field as the winding G′. Furthermore, the resistance of G shall be equal to the resistance of G′, and the number of turns in the coil G shall equal the number of turns in the coil G′.

While, as above stated, the resistance T may be any known or unknown resistance of any character and for any purpose, it will be here described as the bulb or thermometer resistance such as used in electrical temperature measurements. In such case the resistance T may be a platinum, nickel, or other suitable wire or conductor, inclosed in a suitable envelop or bulb, and having a definite temperature coefficient and a definite initial resistance. That is to say, the thermometer is preferably an interchangeable one; that is, one of any number, all having the same temperature coefficient and all having the same resistance at ordinary temperatures.

$y$ and $y'$ are the thermometer leads which extend from the terminals of the resistance T to the binding posts A and B of the measuring instrument. In other words, the thermometers T may be at any distance from the instrument and there may be any number, interchangeable, as above stated, and means for connecting any one of them to the instrument. There is included between the sliding contact $w$ and the binding post C the source of energy B and the resistance $r$. This resistance $r$ is provided preferably when the source B is an ordinary lighting or power circuit as, for example, a 110 volt circuit. If the source B be of far less potential the resistance $r$ may be accordingly reduced in value or even entirely omitted. From the binding post C to the terminal $d$ of the bulb resistance T extends the conductor $v$. The conductors $y$, $y'$ are preferably disposed side by side or in a twist or braid, so that both are subjected to the same temperature conditions.

Calling L the entire resistance of the slide wire or resistance conductor W, and $c$ the resistance of the conductor W between the rider or sliding contact $w$ and the point $a$, and remembering that the resistance of G is equal to the resistance of G′, and that $y$ and $y'$ are similar in resistance (being similar in material, length, and cross section) we have, for a condition of balance when the shunt S is not present, the following equation:

$$c + G + R + y = L - c + G + y' + T \quad (1)$$

from which follows, since $y = y'$ $$T = 2c + R - L. \quad (2)$$

This shows that the leads $y$ and $y'$ eliminate and introduce no error. But R is a constant as is also L, so that we may write:

$$T = 2c + k, \; k \text{ being a constant.} \quad (3)$$

Differentiating T with respect to $c$ we have:

$$\frac{dT}{dc} = 2 \text{ or } \frac{dc}{dT} = \tfrac{1}{2}. \quad (4)$$

This means that the variation of the resistance T with respect to $c$, the amount of resistance between the point $a$ and the sliding contact $w$, is constant and that T varies twice as fast as $c$. Therefore, the resistance L, that is, the total resistance of the slide wire or adjustable resistance W is taken equal to one-half of the total resistance increment of the bulb resistance T when the shunt S is not present. Thus, assuming that the instrument is to be used for measuring temperatures between certain limits and that between those limits of temperature the resistance T increases ten ohms, then the slide wire W need have a total resistance of only five ohms, though in practice it might be given a somewhat larger resistance. It follows, therefore, that by taking the wire or conductor W of more or less resistance the range of temperature measured by the instrument may be greater or less.

The fixed or constant resistance R is taken equal to the resistance T corresponding with the low end of the temperature interval to be measured by the instrument. That is to say, assuming the lowest temperature to be measured by the instrument to be $t$ degrees, the resistance R is taken equal to the resistance T at the temperature $t$. And for best sensibility of the instrument the resistance of each coil G and G′ is taken equal to R, that is, equal to the resistance T at the low end of the temperature interval to be measured.

The resistance of the bulb or thermometer conductor T increases as the temperature to which it is subjected increases. But the law of variation of resistance with temperature is not a simple proportion or linear function, except over small temperature variations. In consequence, the scale, as $e$, with which the pointer on the sliding contact $w$ coöperates, will not be a uniform one, i. e. the distances between different scale divisions will not all be equal to each other. If, however, the nature of the resistance T is such that its variation from a linear function is very slight, the instrument scale may be made uniform as to its scale divisions. But since the law of variation of T is not a linear function or a simple proportion, and to still be able to use a uniform scale on the instrument, the slide wire or resistance W must not increase in resistance uniformly with its length measured from the low temperature end of the scale. That is to say, the wire or conductor W must not increase in resistance uniformly from point $a$ toward point $b$, but must increase non-uniformly to correct for the non-uniform increase in resistance of T with increasing temperature. Accordingly, assuming that the resistance of T does not increase as rapidly as the temperature to which it is subjected, that is, assuming that the resistance temperature curve of T is represented by the curve $h$, Fig. 4, correction or modification in the wire W may be determined by the method now to be described.

In Fig. 4 distance or abscissæ measured along the horizontal axis O—X are temperatures above the lowest to which the thermometer is subjected. For convenience of explanation this minimum temperature is called O. Ordinates or distances measured along the axis O—Y represent increments in resistance in ohms of the bulb or thermometer resistance T. The resistance for convenience of explanation is called O at the minimum temperature. The curve $h$ is determined by subjecting the resistance T to different temperatures, measuring each temperature by an air thermometer, or other means, and measuring the resistance of T for each of such temperatures by a Wheatstone bridge or other well known method of measuring resistance. The straight line O—$q$ represents what would be the curve, or rather straight line function, if the resistance increased in a directly proportional manner to the temperature. As seen, the curve $h$ at 1,000 degrees temperature falls short of the straight line O—$q$ by an amount $i$; at 900 degrees by an amount $j$; at 800 degrees by an amount $m$; at 700 degrees by an amount $n$, and so on. The line O—$q$ is now drawn at an angle with the axis O—X such that the slope of the line O—$q$ is equal to one-half of the slope of the line O—$g$. This for the reason that the resistance $c$, between point $a$ and the sliding contact $w$, varies just one-half as rapidly as T. Then, at the 1,000 degree ordinate a point $s$ is taken at a distance below $q$ equal to one-half of $i$. And so on at the other ordinates, points are taken below the line O—$q$ equal to one-half of $j$, one-half of $m$, one-half of $n$, and so on. These points then determine the curve $u$ drawn between O—$s$.

Assuming now that the range of the instrument is from 500 to 1,000 degrees, a uniform scale, $e$, reading from 500 to 1,000 degrees is placed upon the instrument. But the resistance of the conductor W is so modified or varied that at the different positions of the pointer on $w$ the resistances of W correspond with the ordinates of the curve $u$ at the respective temperatures. The slide wire or conductor W may then be decreased in its cross section, the cross section varying throughout its length so that at different scale positions of slider $w$, the resistances of W measured from $a$ to $w$, that is, $c$, shall correspond with the ordinates of the curve $u$ at the different temperatures.

While the slide wire or variable resistance W may be a straight wire over whose entire length the contact $w$ may engage and whose cross section may be varied throughout its length, as above described, such conductor W may be disposed in a helix, a fragmentary portion of which is shown in Fig. 2, the insulated conductor 3 being bared, and buffed or ground as at 4, according to prior Letters Patent of the United States No. 862,842, heretofore granted to me. Then, to modify or taper the resistance of the conductor to correct for the resistance T, the conductor W may be ground or buffed off to a greater or less extent throughout its length, as shown in Fig. 3, which is a longitudinal cross section on the line Z—Z of Fig. 2, insulation being omitted for clearness. It is to be understood, however, that the variation in the cross section shown in Fig. 3 does not necessarily correspond to the corrections required as shown by Fig. 4, but is illustrative only of how throughout the length of the helix the conductor may at the bared portion 4 be reduced in cross section to different degrees. Accordingly, when the sliding contact $w$ of Fig. 1, or the sliding contact 5 of my said prior patent, is moved along, the resistance $c$, of Fig. 1, does not increase uniformly, but increases in such manner as to compensate for the variation from a linear law of the resistance T and yet make it possible to use a uniform scale. In this way any number of scales may be made and stamped at one time for any number of instruments.

With a given slide wire or adjustable resistance W a given range of temperatures may be measured. To change the range of temperature measured, without in any way changing the resistance of W, a shunt S may be brought into circuit by the closure of a switch or the insertion of a plug, as $p$, or by permanently connecting the resistance S to the points $a$ and $b$. This will reduce the scale range of the instrument; or a second scale, as $f$, may be provided in the case where the shunt S may be brought into circuit by plugging or otherwise. That is, without the shunt S scale $e$ may be used, and when S is connected in circuit the second scale $f$ is read. Or by making the instruments all alike or standard when the shunt S is present only a single scale $f$ may be provided, which, however, is different from the scale $e$ which would be provided if the shunt S were absent.

With the shunt S in circuit as shown, and L being uniform, we have the equation:

$$T = \frac{2cS}{S+L} + \frac{R(L+S) - LS}{S+L} \quad (5)$$

in which the second term is a constant. Calling this constant $k'$, we have $$T = \frac{2cS}{S+L} + k'. \quad (6)$$

To determine how $c$ varies when T varies, we differentiate the last equation and find that $$\frac{dT}{dc} = \frac{2S}{S+L} \quad (7)$$

This means that T varies uniformly with $c$ and $\frac{2S}{S+L}$ times as fast as T. Suppose S is infinite, that is, that S is absent, we then have $$\frac{dT}{dc} = \frac{2}{1+\frac{L}{S}} = 2 \quad (8)$$

which agrees with equation (4) *supra*.

These equations teach that the slide wires or adjustable resistances W may for all instruments be wound to the same convenient resistance provided this is equal to the greatest resistance required, and then be shunted, as by S, to change the extent of range of the instrument. Assuming the range of the instrument to be from 500 to 1,000 degrees with the shunt S absent, by the use of such shunt the range may be changed to 500 degrees to 600 degrees.

The proper resistance value to give the slide wire or adjustable resistance W is:

$$L = \text{inc. } c - \frac{S+L}{2S} \text{inc. T} \quad (9)$$

where inc. $c$ is the total increment or increase in $c$ and where inc. T is the total increment or increase in T due to temperature.

In any particular case the values of inc. T and L are known and we must find what resistance value to give to S. This is determined by solving equation 9 for S, which gives:

$$S = \frac{L \text{ inc. T}}{2L - \text{inc. T}} \quad (10)$$

Increment T and L being known in any case, S is easily determined.

If inc. T = 2L, S is infinite, and there should be no shunt resistance S. Thus, as a particular case, suppose that due to the increase in temperature from 500 degrees to 1,000 degrees T increases $10\omega$ (ten ohms) in resistance. And suppose the slide wire has a resistance $L = 6\omega$, then by substituting these values in equation 10, we find that $S = 30\omega$.

A shunt S may at all times be used when it is true of the bulb or thermometer resistance, or other resistance T, that its resistance is a linear function of temperature or very nearly so. In the case where a tapered or modified slide wire or adjustable resistance W is used, as hereinbefore described, for the purpose of compensating or correcting for variations from a linear function, a shunt S of relatively low resistance cannot be used, without introducing considerable error. However, when a tapered or modified slide wire or adjustable resistance W is used, a shunt S of relatively high resistance may be employed with the introduction of only a slight error.

From the foregoing description and consideration, it is now apparent that by using the same slide wire or adjustable resistance W, and by introducing a shunt S, the temperature range of the scale of the instrument is varied or changed; and by changing the value of the fixed resistance R, the temperature range of the instrument may be shifted, though keeping the extent of range the same. Thus, introducing a shunt S may, as shown in Fig. 1, change the instrument range from 500 degrees to 1,000 degrees to 500 degrees to 600 degrees; and by changing the fixed resistance R the range of the instrument may be shifted as from 500 degrees to 1,000 degrees to 300 degrees to 800 degrees. It will, of course, be understood that R can be changed or varied to shift the temperature range of the instrument without regard to whether S is present or not; and that irrespective of the value of R or the position of the temperature range of the instrument, the shunt S may be used to change the range of the instrument.

From the foregoing description, it follows that I have devised an instrument involving a differential galvanometer, or other differentia¹ instrument as described, for use in a zero or balancing method, wherein a uniform scale is possible, the scales for any number of instruments being interchangeable; that I have provided means for both changing the range of the instrument, and for shifting the temperature range of the instrument; and that I have provided a modified or compensated slide wire or variable resistance for insuring a uniform scale.

By my invention a plurality of instruments may be made up as standards and all similar to each other, and then by the use of the shunt S or by the change in the resistance of R, with interchangeable thermometers T, suit such standard instrument for a variety of temperature ranges or a variety of positions of temperature range. And, furthermore, by the arrangement described, there is perfect compensation for the thermometer leads.

What I claim is:

1. In an electrical measuring instrument, the combination with circuit branches, having an adjustable resistance common to said circuit branches, of a uniform scale associated with said adjustable resistance, and a resistance in shunt to said adjustable resistance for determining the range of said scale.

2. In an electrical measuring instrument, the combination with circuit branches, having an adjustable resistance common to said branches, of a resistance in a branch changing non-uniformly with respect to a quantity to be measured, and a uniform scale associated with said adjustable resistance, said adjustable resistance being made non-uniform in resistance with respect to its length for compensating for the non-uniform change in resistance of said branch resistance.

3. In an electrical measuring instrument, the combination with circuit branches, said branches closed through a common path, a slide wire common to said branches, a movable contact engaging said slide wire and included in said common path, said slide wire made non-uniform in resistance with respect to its length for compensating for a non-uniform change of resistance in a branch changing non-uniformly with respect to a quantity to be measured, and a uniform scale associated with said slide wire.

4. In an electrical measuring instrument, the combination with a slide wire, of circuits to be balanced thereby, said wire being non-uniform in resistance per unit of length for compensating for a non-uniform change of resistance in said circuits, an associated uniform scale, and a resistance in shunt to said slide wire for determining the range of said scale.

5. In an electrical measuring instrument, circuit or resistance balancing means comprising a resistance with a movable contact, a winding of a differential instrument and a variable resistance in one branch, the other winding of said instrument and a fixed resistance in another branch, a source of current, and a uniform scale associated with said movable contact.

6. In an electrical measuring instrument, circuit branches balancing means common to said circuit branches comprising a resistance with a movable contact, a winding of a differential galvanometer and a variable resistance connected in one branch, another winding of said differential galvanometer and a fixed resistance connected in another branch, a source of current, and a uniform scale associated with said movable contact.

7. In an electrical measuring instrument, circuit branches balancing means common to said circuit branches comprising a resistance and a movable contact, a winding of a differential galvanometer and a variable resistance connected in one branch, another winding of said differential galvanometer and a fixed resistance connected in another branch, said galvanometer windings being equal in resistance, a source of current, and a uniform scale associated with said movable contact.

8. In an electrical measuring instrument, circuit or resistance balancing means comprising a resistance and a movable contact, a winding of a differential instrument and a thermometer resistance connected in one branch, another winding of said differential instrument and a fixed resistance connected in another branch, a connection from said movable contact to a terminal of said thermometer resistance, said connection including a source of energy, and a uniform scale associated with said movable contact.

9. In an electrical temperature measuring instrument, circuit or resistance balancing means comprising a resistance and a movable contact, a winding of a differential galvanometer and a thermometer resistance connected in one branch, another winding of said differential galvanometer and a fixed resistance connected in another branch, a source of current, and a uniform scale associated with said movable contact.

10. In an electrical temperature measuring instrument, circuit or resistance balancing means comprising an adjustable resistance and a movable contact, a winding of a differential instrument and a thermometer resistance connected in one branch, another winding of said differential instrument and a fixed resistance connected in another branch, and a source of current, said adjustable resistance being non-uniform in resistance with respect to its length to compensate for disproportionate change of resistance with respect to temperature of the thermometer resistance, whereby a uniform scale may be associated with said movable contact.

11. In an electrical temperature measuring instrument, circuit or resistance balancing means comprising a resistance and a movable contact, a winding of a differential instrument and a thermometer resistance connected in one branch, another winding of said differential instrument and a fixed resistance connected in another branch, and a source of current, said fixed resistance being equal to the resistance of said thermometer corresponding with the lower end of the temperature range of the measuring instrument.

12. In an electrical temperature measuring instrument, circuit or resistance balancing means comprising a resistance and a movable contact, a winding of a differential instrument and a thermometer resistance connected in one branch, another winding of said differential instrument and a fixed resistance connected in another branch, a source of current, said fixed resistance being equal to the resistance of said thermometer corresponding with the lower end of the temperature range of the measuring instrument, and a uniform scale associated with said movable contact.

13. In an electrical temperature measuring instrument, circuit or resistance balancing means comprising a winding of a differential instrument and a thermometer resistance connected in one branch, another winding of said differential instrument and a fixed resistance connected in another branch, and a source of current, said fixed resistance being equal to the resistance of said thermometer at a temperature corresponding with the low end of the range of the measuring instrument.

14. In an electrical temperature measuring instrument, circuit or resistance balancing means comprising a slide wire or resistance and a movable contact, a winding of a differential instrument and a thermometer resistance connected in one branch, another winding of said differential instrument and a fixed resistance connected in another branch, and a source of current, said slide wire or resistance having a resistance at least equal to half of the resistance increment of said thermometer resistance.

15. In an electrical measuring instrument, circuit or resistance balancing means comprising an adjustable resistance, a winding of a differential instrument and a variable resistance connected in one branch, the other winding of said differential instrument and a fixed resistance connected in another branch, and a resistance in shunt to said adjustable resistance.

16. In an electrical measuring instrument, circuit or resistance balancing means comprising an adjustable resistance with a movable contact, a winding of a differential instrument and a variable resistance connected in one branch, the other winding of said differential instrument and a fixed resistance connected in another branch, a resistance in shunt to said adjustable resistance, and a scale associated with said movable contact.

17. In an electrical temperature measuring instrument, circuit or resistance balancing means comprising an adjustable resistance with a movable contact, a winding of a differential instrument and a thermometer resistance connected in one branch, the other winding of said differential instrument and a fixed resistance connected in another branch, a source of current, and a resistance connected in shunt with said adjustable resistance.

18. In an electrical temperature measuring instrument, circuit or resistance balancing means comprising an adjustable resistance with a movable contact, a winding of a differential instrument and a thermometer resistance connected in one branch, the other winding of said differential instrument and a fixed resistance connected in another branch, a source of current, a resistance connected in shunt with said adjustable resistance, and a scale associated with said movable contact.

19. In an electrical temperature measuring instrument, circuit or resistance balancing means comprising an adjustable resistance with a movable contact, a winding of a differential instrument and a thermometer resistance connected in one branch, the other winding of said differential instrument and a fixed resistance connected in another branch, and a source of current, said adjustable resistance being modified to compensate for the disproportionate change in resistance of said thermometer with respect to temperature, whereby a uniform scale may be associated with said movable contact.

20. In an electrical temperature measuring instrument, circuit or resistance balancing means comprising a resistance adjustable by a movable contact, a winding of a differential instrument and a thermometer lead and a thermometer resistance connected in a branch, another winding of said differential instrument and a fixed resistance and a second thermometer lead connected in another branch, and a connection from the thermometer end of said second thermometer lead to said movable contact.

21. In an electrical temperature measuring instrument with perfect elimination of thermometer lead error, a resistance adjustable by a movable contact, a winding of a differential instrument a thermometer lead and a thermometer resistance connected in one branch, another winding of said differential instrument and a fixed resistance and a second thermometer lead connected in another branch, a connection from the thermometer end of said second thermometer lead to said movable contact, said thermometer leads being similar in material, cross section and length and disposed in close proximity to each other throughout their lengths.

23. In an electrical temperature measuring instrument, the combination with circuit branches, of an adjustable balancing resistance, a thermometer resistance, said adjustable resistance being made non-uniform in resisting with respect to its length for compensating for the non-uniform change in said thermometer resistance with respect to temperature, and a uniform scale graduated in temperature units associated with said adjustable resistance.

23. In an electrical temperature measuring instrument, the combination with circuit branches, of an adjustable balancing resistance, a movable contact for adjusting said resistance, a thermometer resistance, said adjustable resistance being made non-uniform for compensating for the non-uniform change in resistance of said thermometer resistance, equal increments of movement of said movable contact corresponding with equal increments of temperature change.

24. In an electrical temperature measuring instrument, the combination with circuit branches, said branches being closed through a common path, an adjustable balancing resistance, a movable contact coöperating therewith and connected in said common path, an associated thermometer resistance, said adjustable resistance being made non-uniform for compensating for the non-uniform change in resistance of said thermometer resistance, equal increments of movement of said movable contact corresponding with equal increments of temperature change.

25. In an electrical temperature measuring instrument, the combination with circuit branches, said circuit branches closed through a common path, an adjustable balancing resistance common to said branches, a coöperating movable contact in said common path, a thermometer resistance in one branch, windings of a differential instrument connected in different branches, said adjustable balancing resistance being made non-uniform for compensating for the non-uniform change in resistance of said thermometer resistance, equal increments of movement of said movable contact corresponding with equal increments of temperature change.

26. In an electrical temperature measuring instrument, the combination with circuit branches, said branches being closed through a common path, an adjustable balancing resistance, a movable contact coöperating therewith and connected in said common path, an associated thermometer resistance, said adjustable resistance being made non-uniform for compensating for the non-uniform change in resistance of said thermometer resistance, equal increments of movement of said movable contact corresponding with equal increments of temperature change, and a resistance in shunt to said adjustable resistance.

27. In an electrical temperature measuring instrument, the combination with circuit branches, said circuit branches closed through a common path, an adjustable balancing resistance common to said branches, a coöperating movable contact in said common path, a thermometer resistance in one branch, windings of a differential instrument connected in different branches, said adjustable balancing resistance being made non-uniform for compensating for the non-uniform change in resistance of said thermometer resistance, equal increments of movement of said movable contact corresponding with equal increments of temperature change, and a resistance in shunt to said adjustable resistance.

28. In an electrical measuring instrument, the combination with branches, having an adjustable resistance common to said circuit branches, of windings of a differential instrument connected in the different circuit branches, and a resistance in shunt to said adjustable resistance for determining the range of the instrument.

29. In an electrical measuring instrument, the combination with circuit branches closed through a common path, of windings of a differential instrument connected in the different circuit branches, an adjustable resistance common to said branches and engaged by a movable contact in said common path, a resistance in one branch subjected to and varied by the quantity to be measured, and a scale associated with said adjustable resistance.

30. In an electrical measuring instrument, the combination with circuit branches closed through a common path, of windings of a differential instrument connected in the different circuit branches, a slide wire, a movable contact engaging said slide wire for dividing the same between said branches, a resistance in one branch subjected to and varied by the quantity to be measured, and a scale associated with said slide wire.

31. In an electrical measuring instrument, the combination with circuit branches closed through a common path, of windings of a differential instrument connected in the different branches, a slide wire, a movable contact engaging said slide wire for dividing said slide wire between said branches, said slide wire made non-uniform in resistance with respect to its length for compensating for a change of resistance in a branch changing non-uniformly with respect to a quantity to be measured, and a scale associated with said slide wire.

32. In an electrical measuring instrument, the combination with circuit branches, of a slide wire common to said branches, windings of a differential instrument connected in the different branches, and a resistance connected in one branch and subjected to and varied by the quantity to be measured, the slide wire resistance being at least half the range in resistance of said resistance connected in one branch.

33. In an electrical measuring instrument, the combination with circuit branches, of a slide wire common to said branches, windings of a differential instrument connected in the different branches, a variable resistance connected in one branch, the slide wire resistance being at least half the range in resistance of said variable resistance, and a resistance in shunt to said slide wire.

34. In an electrical measuring instrument, the combination with circuit branches, of a slide wire common to said branches, windings of a differential instrument connected in the different branches, a resistance connected in one branch and subjected to and varied by the quantity to be measured, the slide wire resistance being at least half the range in resistance of said resistance connected in one branch, and a scale associated with said slide wire.

35. In an electrical measuring instrument, the combination with circuit branches, of a slide wire common to said branches, windings of a differential instrument connected in the different branches, a variable resistance connected in one branch, the slide wire resistance being at least half the range in resistance of said variable resistance, a resistance in shunt to said slide wire, and a scale associated with said slide wire.

In testimony whereof I have hereunto affixed my signature in the presence of two subscribing witnesses.

EDWIN F. NORTHRUP.

Witnesses:
HENRY S. PRICKETT,
GEO. S. GANDY.

---

It is hereby certified that in Letters Patent No. 950,513, granted March 1, 1910, upon the application of Edwin F. Northrup, of Philadelphia, Pennsylvania, for an improvement in "Electrical Measuring Instruments," errors appear in the printed specification requiring correction as follows: Page 4, line 45, in the equation, the letter $l$ should read $1$ (unity); page 5, lines 73 and 83, after the word "branches" commas should be inserted; page 7, line 13, the word "resisting" should read *resistance;* and that the said Letters Patent should be read with these corrections therein that the same may conform to the record of the case in the Patent Office.

Signed and sealed this 22d day of March, A. D., 1910.

[SEAL.]

C. C. BILLINGS,
*Acting Commissioner of Patents.* ance with respect to its length for compensating for a change of resistance in a branch changing non-uniformly with respect to a quantity to be measured, and a scale associated with said slide wire.

32. In an electrical measuring instrument, the combination with circuit branches, of a slide wire common to said branches, windings of a differential instrument connected in the different branches, and a resistance connected in one branch and subjected to and varied by the quantity to be measured, the slide wire resistance being at least half the range in resistance of said resistance connected in one branch.

33. In an electrical measuring instrument, the combination with circuit branches, of a slide wire common to said branches, windings of a differential instrument connected in the different branches, a variable resistance connected in one branch, the slide wire resistance being at least half the range in resistance of said variable resistance, and a resistance in shunt to said slide wire.

34. In an electrical measuring instrument, the combination with circuit branches, of a slide wire common to said branches, windings of a differential instrument connected in the different branches, a resistance connected in one branch and subjected to and varied by the quantity to be measured, the slide wire resistance being at least half the range in resistance of said resistance connected in one branch, and a scale associated with said slide wire.

35. In an electrical measuring instrument, the combination with circuit branches, of a slide wire common to said branches, windings of a differential instrument connected in the different branches, a variable resistance connected in one branch, the slide wire resistance being at least half the range in resistance of said variable resistance, a resistance in shunt to said slide wire, and a scale associated with said slide wire.

In testimony whereof I have hereunto affixed my signature in the presence of two subscribing witnesses.

EDWIN F. NORTHRUP.

Witnesses:
HENRY S. PRICKETT,
GEO. S. GANDY.

---

It is hereby certified that in Letters Patent No. 950,513, granted March 1, 1910, upon the application of Edwin F. Northrup, of Philadelphia, Pennsylvania, for an improvement in "Electrical Measuring Instruments," errors appear in the printed specification requiring correction as follows: Page 4, line 45, in the equation, the letter $l$ should read $1$ (unity); page 5, lines 73 and 83, after the word "branches" commas should be inserted; page 7, line 13, the word "resisting" should read *resistance;* and that the said Letters Patent should be read with these corrections therein that the same may conform to the record of the case in the Patent Office.

Signed and sealed this 22d day of March, A. D., 1910.

[SEAL.]

C. C. BILLINGS,
*Acting Commissioner of Patents.*

It is hereby certified that in Letters Patent No. 950,513, granted March 1, 1910, upon the application of Edwin F. Northrup, of Philadelphia, Pennsylvania, for an improvement in "Electrical Measuring Instruments," errors appear in the printed specification requiring correction as follows: Page 4, line 45, in the equation, the letter $l$ should read $1$ (unity); page 5, lines 73 and 83, after the word "branches" commas should be inserted; page 7, line 13, the word "resisting" should read *resistance;* and that the said Letters Patent should be read with these corrections therein that the same may conform to the record of the case in the Patent Office.

Signed and sealed this 22d day of March, A. D., 1910.

[SEAL.]

C. C. BILLINGS,
*Acting Commissioner of Patents.*